United States Patent [19]

Kinsman

[11] 4,145,485
[45] Mar. 20, 1979

[54] METHOD FOR SEALING BATTERY

[75] Inventor: Gordon F. Kinsman, Billerica, Mass.

[73] Assignee: Polaroid Corporation, Cambridge, Mass.

[21] Appl. No.: 809,975

[22] Filed: Jun. 27, 1977

Related U.S. Application Data

[62] Division of Ser. No. 761,650, Jan. 24, 1977, Pat. No. 4,069,578.

[51] Int. Cl.² ............................................. H01M 6/46
[52] U.S. Cl. ..................................... 429/152; 429/162
[58] Field of Search ............... 429/162, 153, 154, 152, 429/151, 149, 163, 155, 210

[56] References Cited

U.S. PATENT DOCUMENTS

| | | | |
|---|---|---|---|
| 2,521,800 | 9/1950 | Martinez et al. ..................... | 429/155 |
| 2,843,649 | 7/1958 | Louis ................................... | 429/154 |
| 3,563,805 | 2/1971 | Deierhoi, Jr. ......................... | 429/152 |
| 3,674,565 | 7/1972 | Bergum et al. ..................... | 429/162 X |
| 3,770,504 | 11/1973 | Bergum ............................. | 429/162 X |
| 3,907,599 | 9/1975 | Fanciullo et al. ..................... | 429/152 |
| 4,007,472 | 2/1977 | Land ................................. | 429/162 X |
| 4,028,479 | 6/1977 | Fanciullo et al. ............... | 429/162 X |

Primary Examiner—Anthony Skapars
Attorney, Agent, or Firm—John W. Ericson

[57] ABSTRACT

A method of sealing a laminar battery in which the central region of the battery is cooled and held under pressure while the peripheral regions of the battery are heated under the same or a lower pressure. The thicknesses of the materials are chosen so that the completed battery is substantially as thick at the edges as in its central regions.

2 Claims, 5 Drawing Figures

METHOD FOR SEALING BATTERY

This is a division of application Ser. No. 761,650, filed Jan. 24, 1977, now U.S. Pat. No. 4,069,578.

This invention relates to the art of laminar battery manufacture, and particularly to a novel method of making and sealing a laminar battery to reduce its internal impedance.

It is well known that thin flat laminar batteries are especially useful in high current drain applications because of their potentially low impedance characteristics. A specific application of this kind is illustrated by the four cell laminar battery made and sold as a component of a Polaroid SX-70 film pack, by Polaroid Corporation of Cambridge, Mass. As an indication of the typical performance requirements for such batteries, they are commonly evaluated in terms of the number of 1.1 second pulses delivered to a 3.3 ohm load before reaching a closed circuit voltage of four volts. A production battery in good condition will normally deliver about 100 of such pulses.

It has been found that such batteries will generally show a higher closed circuit voltage if held under pressure during the test. This result is not particularly surprising, because batteries of this kind are not manufactured with any specific mechanism for holding them in compression. To achieve the maximum closed circuit voltage and minimize impedance, earlier workers in the art employed encircling tapes, or packed the cells of the battery in cases, or both, so that the cells would be held under pressure in use. U.S. Pat. No. 2,870,235, issued on Jan. 20, 1959 to D. G. Soltis for Cathodic Envelope Cell, is illustrative of this approach. Later workers, desiring to avoid such compressive structures because of the inherent space that would be required, particularly for batteries of few cells where the ratio of area to thickness is large, have preferred to include adhesive binders in the various layers of the battery. Batteries of this kind are described in U.S. Pat. No. 3,770,504, issued on Nov. 6, 1973 to Bernard C. Bergum. For high discharge rate multicell batteries, however, as indicated in that patent, even when fully bonded there is still a noticeable improvement in closed circuit voltage with applied pressure. And the inclusion of adhesive binders necessarily increases internal impedance in a manner that is particularly noticeable at very high current drains, although it may not be a serious factor at moderately high current drains.

For very high current drain applications, as in charging an electronic flash unit for flash photography when rapid recycle time is desired, the inevitable loss in electrical properties encountered with the use of binders in the various components of the battery, and particularly in the cathode mix, is highly undesirable. As disclosed in copending U.S. Application for Letters Patent Ser. No. 684,370, filed on May 7, 1976, now abandoned, by Edwin H. Land for Electrical Cells And Batteries and assigned to the assignee of this application, it has been found that very high current drain capabilities can be achieved without any binder in a battery having a wet cathode mix in combination with a cellophane separator. Such batteries typically have an extremely low internal impedance even without external compressive stress applied, but typically exhibit a still lower impedance under pressure. The objects of this invention are to extend the shelf life, reduce the internal impedance, and increase the closed circuit potential of laminar batteries without external compressive stress applying members.

Briefly, the above and other objects of the invention are attained by a method of making a flat laminar battery in which the thicknesses of the components are related to the conditions under which the battery is sealed such that the peripheral thickness of the finished battery is substantially the same as the thickness in the center.

During sealing, pressure is maintained on the active central areas of the battery, and those areas are cooled, while the peripheral seal is completed. The peripheral seal is completed under low pressure conditions with a relatively high temperature at which the seal can be formed without appreciable flow, so that the final battery structure is substantially the same thickness at the edges as it is in the center. It has been found that a battery made in this way has a higher closed circuit voltage relative to its open circuit voltage, and that the closed circuit voltage is relatively independent of pressure.

U.S. Pat. No. 3,563,805, issued on Feb. 16, 1971 to W. H. Deiorhoi, Jr. for Thin Flat Primary Cells and Batteries shows a framed two cell battery construction which appears to be of uniform thickness. However, internal adhesives are relied on to hold the elements together, and sealing by heat and pressure applied at the marginal portions is described. U.S. Pat. No. 3,488,220, issued on Jan. 6, 1970 to A. E. Lyall et al., shows a rechargeable alkaline cell with molded neoprene sealing rings and of uniform thickness, but relying on thick and rigid outer carrier plates to prevent bulging. Batteries of the kind with which this invention is concerned have considerably thinner and more flexible components, and are subject to substantial marginal compression during sealing unless special steps are taken to avoid it.

In this regard, the battery made and sold as a component of the familiar Polaroid SX-70 Land film pack is normally thought of as planar; it is thin and flat in overall appearance and is so shown and described in various patents concerned with modifications or adaptations of the battery, such as U.S. Pat. Nos. 3,877,045, issued on Apr. 8, 1975 to Stanley M. Bloom et al., and 3,899,355, issued on Aug. 12, 1975 to Charles K. Chiklis, for example. On close inspection of the actual battery, however, preferably with a micrometer, it will be seen that as currently made there is measurable difference of something like fifty percent between the edge thickness and the central thickness.

The matter in which it is preferred to practice the invention will best be understood in the light of the following detailed description, together with the accompanying drawings of illustrative embodiments of the invention.

Figure 1:
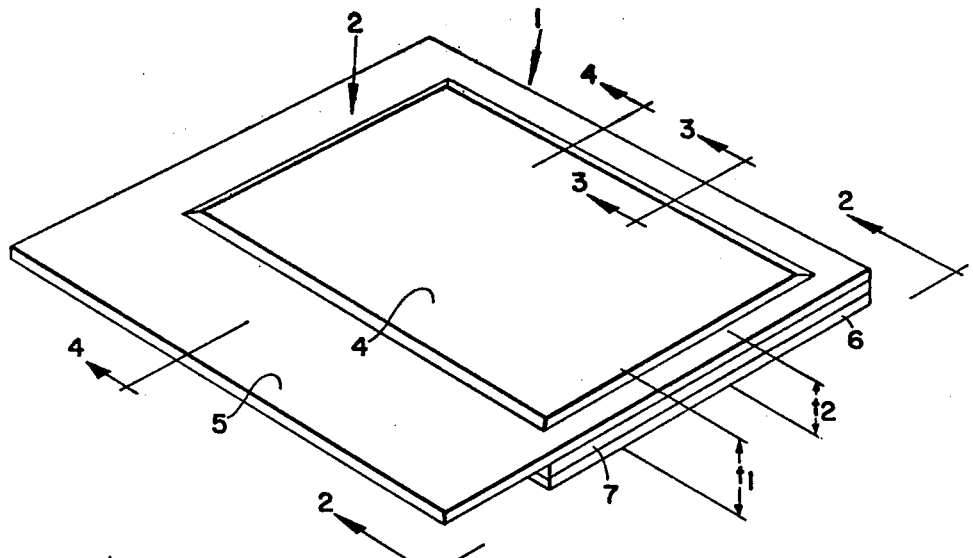
FIG. 1 is a schematic perspective sketch of a laminar battery at a late stage in its manufacture that may be considered as representative either of a battery in accordance with the prior art, or in accordance with the invention, depending on relative dimensions to be described.
Figure 5:
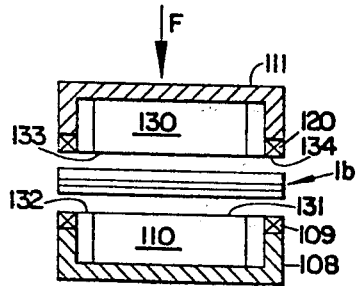
Figure 2:
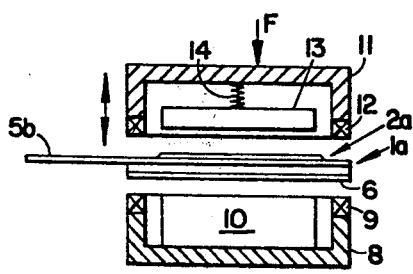
FIG. 2 is a diagrammatic fragmentary sketch, with parts shown in cross section, illustrative of a prior art method of sealing laminar batteries.
Figure 4:
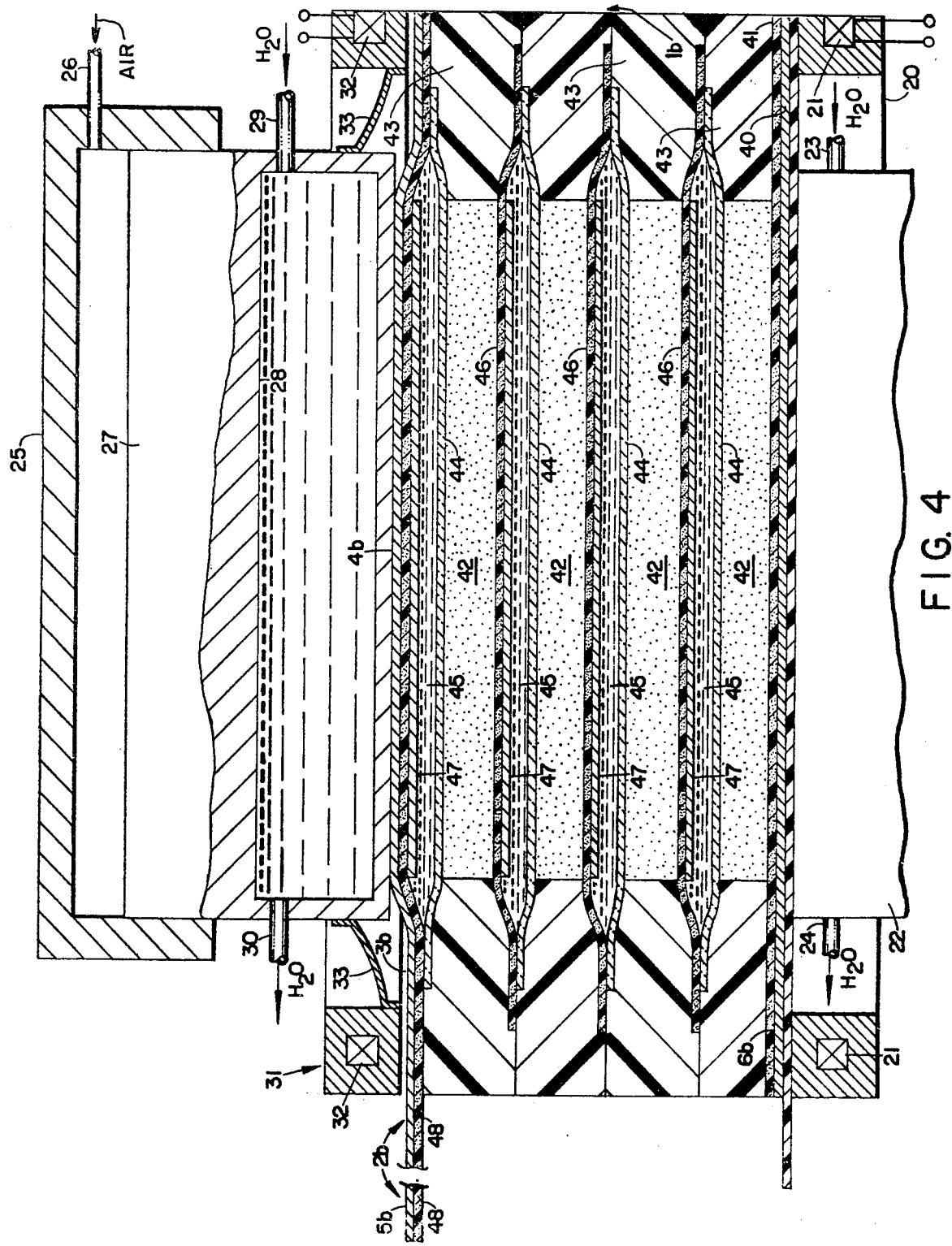

FIG. 4 is a highly schematic elevational sketch, with parts shown in cross section and parts broken away, and on an exaggerated vertical scale relative to the horizontal scale, taken substantially along the lines 4—4 in FIG. 1 and illustrating the method of sealing a battery in accordance with the invention; and FIG. 5 is a schematic fragmentary sketch, with parts shown in cross section, illustrating a modification of the conventional apparatus shown in FIG. 2 for the practice of the invention in another embodiment.

Figure 3:
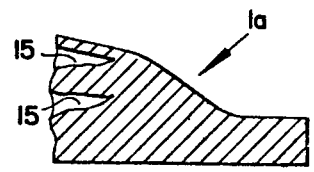
FIG. 3 is a schematic fragmentary sketch, with parts shown in cross section and parts broken away, illustrating with exaggeration a characteristic of batteries sealed in accordance with the method of FIG. 2, and taken substantially along the lines 3—3 in FIG. 2.

Referring first to FIG. 1, a typical flat laminar battery 1 is shown at a stage following sealing and before the terminal flap is folded over. Depending upon relative dimensions to be discussed, this battery may be considered to be of the prior art variety, to be described as battery 1a in FIGS. 2 and 3, or if made and sealed in accordance with the invention, as a battery 1b to be described in connection with FIG. 4.

The essential external characteristics of the battery 1 are a metal outer terminal 2, of steel, aluminum or the like, which characteristically shows a more or less depressed region 3 around the periphery, and a somewhat raised central portion 4. In accordance with one conventional practice, a terminal extension 5 is provided which will later be folded around the battery to form one terminal thereof on the same side as a second terminal formed by a metallic terminal 6 of steel, aluminum or the like. Other internal laminae of the battery are suggested at 7 in FIG. 1, and will be described in more detail in connection with FIG. 4 below.

The maximum thickness of the battery 1 is shown at t1 in FIG. 1 and the minimum thickness, in the peripheral regions, is shown at t2. In batteries made in accordance with a prior art practice to be described below, t2 is conventionally, for example, 56 percent less than t1. In batteries produced in accordance with the process of the invention to be described, t1 and t2 are much closer together, and are preferably substantially the same.

FIG. 2 illustrates the prior art process of sealing a battery of the kind shown at 1 in FIG. 1 and designated 1a in FIG. 2. The processing apparatus for this purpose includes a fixed lower platen 8 in which there is an electrical heating element 9 to heat the periphery of the battery 1a from the bottom. A fixed lower and inner platen 10 is water-cooled to keep the active region of the battery cool during the sealing operation.

An upper moveable platen 11 is provided with a resistent heating element 12 to heat the periphery of the battery 1a from above. A water cooled upper and inner platen 13 is lightly coupled to the platen 11 by means indicated as a spring 14, such that when a force F is applied to the upper platen 11 it will be driven down into engagement with the battery and with the lower platen 8 under substantial pressure, whereas the platens 13 and 10 will contact the central portion of the battery under light pressure.

Typical pressures that are employed are 60 to 70 pounds per square inch around the heated outer periphery, and, for example, 18 pounds per square inch in the central region of the battery. For mass production, a number of the platen sets are employed in series, and each is applied for a short interval, whereupon the battery is transmitted to the next set of platens, and thence to subsequent sets, each for a short interval, which intervals add up to the desired heat and pressure cycle. The batteries are then transferred to a series of cold presses, which are the same as the hot presses just described except they lack the heating elements 9 and 12, and a series of pressure cycles is performed without heating until the battery is cooled and the seal fully formed.

Not in every case, but in a substantial proportion of batteries manufactured by the process described above in connection with FIG. 2, a fairly large variation in closed circuit voltage with applied pressure will be found. While no theoretical explanation has been conclusively established, referring to FIG. 3, these batteries behave as though they had voids 15 comprising air pockets, not necessarily nearly so large as suggested in FIG. 3, but nevertheless sufficient to interrupt the electrical and mechanical integrity of the battery and thereby produce increased impedance. One explanation for the decreased impedance with applied pressure is that these pockets are more or less displaced by pressure to bring active elements into more intimate contact. One possibility that might explain such pockets is that during the sealing of the battery, with high pressure at the edges and low pressure in the center, the upper steel more or less deforms and undergoes an oil-canning effect that causes it to bulge and entrap, or even draw in, air, before the seal is formed. In particular, it would appear that during the initial hot strikes, thermoplastic portions of the laminae adjacent the steel are softened and flow before the interior laminae are softened. This softened material allows a permanent deformation of the steel around the periphery of the battery that causes the central region to bow upwardly. Thus, any air initially in the battery goes toward the central regions and tends to promote delamination. Further hot strikes before the battery is fully sealed, with intermediate periods without applied pressure, seem to effect a bellows-like action that pumps more air into the battery.

U.S. Pat. No. 3,945,853 suggests squeezing a collation of battery layers together just before sealing to expel air. However, in practice there are commonly gas pockets adjacent the boundaries between components, which would be transmitted to the central regions during sealing in the manner just described, together with any additional air brought in during the sealing cycle.

Another approach, suggested in the above-cited U.S. Pat. No. 2,870,235, is to partially evaluate a cell in the sealing process. Such a procedure would considerably add to the cost and complexity of the manufacturing process. And it has been found that in batteries constructed and sealed in air in accordance with the invention, such gas pockets as do occur tend to be formed and remain in the regions beyond the boundaries of the electrochemically active regions of the battery, where no deleterious effects on internal impedance are produced.

FIG. 4 illustrates the method of sealing a battery in accordance with the invention. The elements of the battery, indicated at 1b, are confined between the platens of a pneumatic press, next to be described. The press comprises a lower fixed outer annular platen 20 provided with a conventional electric heating element suggested at 21. This element 20 is fixed relative to the frame of the apparatus, as is an inner platen 22 arranged to be supplied with chilled cooling water as indicated by input line 23 and an output line 24. The inner platen is slightly separated from the outer platen 20, as shown with some exaggeration in FIG. 4, to provide for thermal insulation between the heated element and the cooled element.

The upper portion of the pneumatic press comprises a cylinder 25 that is fixed to the frame of the apparatus and is arranged to be supplied with air by means of a line 26. A central moveable platen 27 comprises a piston fitting in the cylinder 25 and provided with a hollow chamber 28 that is arranged to be supplied with cooling water flowing through and input line 29 and a return line 30. The lower platen 22 may be similarly constructed. The piston 27 may be raised by reducing the pressure of the air supplied to the line 26, or lowered by increasing the pressure of the air. When the platen 22 is lowered into contact with the battery during the sealing process, a pressure of typically 18 pounds per square inch will be applied to the central region of the battery.

The pneumatic press further comprises an outer upper annular platen 31 in which there is an electrical resistance heating element 32. The upper outer platen 31 is resiliently coupled to the inner platen 27 by means suggested as light resilient springs 33, such that the force applied to the piston 27 by the air supplied to the line 26 does not exert a corresponding force on the platen 31. The arrangement may be such that the platen 31 just clears the battery when the piston 27 is down under pressure, or to just contact the battery with no exerted pressure, or with a low exerted pressure of, for example, one pound per square inch, but in any event substantially less than the pressure applied by the platen 27.

With the exception of specific desired features that will be described, the battery 1b may be of any conventional construction, but as here shown is of the type described in the above referred to copending application Ser. No. 684,370. Referring to FIG. 4, the battery may be built upon a carrier web 40 of any suitable insulating material such as polyethylene, paper or the like.

The web 40 serves as a carrier web for the manufacture of a sequence of batteries, and is cut between batteries after sealing. It may also serve to insulate the cathode from the anode when the anode flap 5b is folded over to place it on the same side of the battery as the cathode. The cathode terminal sheet 6b, of steel, aluminum or the like, is adhered in any suitable way to the insulating carrier sheet 40 as by heat sealing, or with a suitable adhesive or the like. A perforation made in the web 40, not shown, is conventionally provided for electrical access to the cathode terminal 6b.

The cathode terminal 6b is chemically isolated from the active components of the battery, but electrically connected thereto by a conductive plastic sheet 41, prelaminated to the metal terminal 6b in a manner well known in the art per se. On this collector sheet 41 is deposited, by extrusion, silk screening or the like, a layer of cathode mix 42, which essentially comprises a dispersion of manganese dioxide and carbon black in an aqueous solution of electrolytes, preferably including zinc chloride and ammonium chloride.

Formed as separate subassemblies are four rectangular frames 43 of thermoplastic heat sealable material. These frames 43 are preferably pre-bonded to separators 44. The separators 44 may be of any conventional material, but are preferably of cellophane. The lowermost frame 43 with its pre-attached separator 44 is first placed over the first layer of cathode mix 42, and then coated with a layer of gel electrolyte 45 to a depth of approximately 5.4 mils.

Four pre-formed anode subassemblies, each comprising a conductive plastic intercell connector 46 and a dry zinc anode patch 47, are made as a separate operation.

The lower-most of these subassemblies in FIG. 4 is placed over the layer of gel electrolyte and in contact with the frame 43. The second layer of cathode mix 42 is then deposited on the surface of the intercell connector 46 as described above, whereupon the next frame 43 with its separator 44 is put in place and coated with a layer of gel electrolyte 45. Assembly of the battery is continued in this fashion until the upper-most of the frames 43 with its separator 44 is put in place and coated with gel electrolyte 45. Next, a separately prepared subassembly comprising the upper anode terminal metal sheet 2b, prelaminated with a conductive plastic collector sheet 48 and a dry zinc patch anode 49 identical with the anode patches 47 is put in place to complete the initial assembly of the battery.

The battery is now ready for sealing and is disposed between the platens of the pneumatic press in FIG. 4 with the piston 28 raised from its position shown to admit the insertion of the battery, as by the supply of reduced air pressure to the line 26. Next, air under pressure is supplied to the line 26 to bring the pressure of the platen 27 on the battery to approximately 18 pounds per square inch. The platens 31 and 20 exert a light pressure on the exterior periphery of the battery at this time. Extrusion of the gel electrolyte layers 45 is prevented by the fact that there is no space between the frames 43 that would permit it. Electrical energy is now supplied to the heating elements 21 and 32 to raise the temperature of the platens 20 and 31 to approximately 500 degrees fahrenheit, at which temperature they are kept for approximately 8 seconds. The heating elements are then disconnected and the battery is allowed to cool while being maintained under the pressure conditions described above. The platen 27 is then raised and the battery removed, whereupon the assembly of the battery is completed in a manner, well known in the art per se, that forms no part of the present invention.

If desired, the above operations can be carried on a plurality of pneumatic presses, where serial high speed production is desired, such that the heating cycle is broken up into a number of hot strikes and the cooling cycle is broken down into a number of cold strikes. For this purpose, the conventional sealing apparatus shown in FIG. 2 may be modified and operated as next to be described in connection with FIG. 5.

FIG. 5 shows apparatus which may be identical to the apparatus of FIG. 2 with differences to be noted. The components of FIG. 5 which correspond in function to components of FIG. 2 have been given reference characters equal to those in FIG. 2 plus 100.

In particular, the apparatus of FIG. 5 comprises a lower fixed platen 108 that may be the same as the platen 8 in FIG. 2, and provided with a heating element 109 corresponding to the heating element 9 in FIG. 2. The fixed lower inner platen 110 in FIG. 5 may also be identical to the platen 10 in FIG. 2, and provided with a supply of cooling water in a conventional manner that will be sufficiently apparent to the artisan from the above description.

One point to be made about the inner lower platen 110 in FIG. 5 is that its battery engaging surface should be flush with the corresponding surface 132 of the outer platen 108, as shown. In the use of the apparatus of FIG. 2, it is common to make the upper surface of the platen 10 somewhat below the battery engaging surface of the outer platen 8. This is at times done to effect a distribution in edge thickness reduction between the upper and lower edges of the battery 1b. In accordance with this invention, no such result is desired.

The upper platen 111 in FIG. 5 and its heating element 120 may correspond identically to the corresponding elements 11 and 12 in FIG. 2.

The upper inner cooled platen 130 in FIG. 5 is fixed to the upper movable platen 111. The inner platen 130 is provided with a battery engaging surface 133 that is flush with the battery engaging surface 134 of the outer platen 111.

Apparatus for completing the sealing of a battery subjected to a series of hot strikes in one or more hot presses of the type just described may be identical to that shown in FIG. 5 except that the heating elements 109 and 120 are either omitted or not energized. The essential feature, in either event, is that the battery engaging surfaces of the inner and outer platens be coplanar in both the movable upper platen set and the fixed lower platen set.

By the arrangement just described, the battery 1b may be sealed to a uniform thickness in a series of hot strikes with the apparatus of FIG. 5, followed by a series of cold strikes with cold strike presses as described above. A reduction in edge thickness is avoided in this process because the applied pressure is distributed over substantially the entire surface of the battery. In this regard, it is noted that in sealing batteries of the kind described in connection with FIG. 4, a pressure over the battery of about 18 p.s.i.g. has been found best. Higher pressures may lead to seal failures because electrolyte in the cathode mix, or gel electrolyte 45, may be squeezed out into the seal areas.

Sealing conditions in the process just described may be varied in accordance with the requirements of the material chosen for the frames 43 in FIG. 4. For example, using frames 43 of Versalon 1140 polyamide resin, as made and sold by General Mills Coompany of Minneapolis, Minn., each 24 mils in thickness, the upper platen 111 in FIG. 5 was heated to 310 degrees fahrenheit, the lower platen was heated to 345 degrees fahrenheit, and 13 hot strikes were given at 18 p.s.i.g. for 0.350 seconds each. The hot strikes were followed by 4 cold strikes at 2 p.s.i.g. of 0.315 seconds each.

Four cell batteries of the kind shown in FIG. 4 were made as described in the following example.

EXAMPLE I

A cathode mix was made with the following composition, in which quantities are given both in weight percent, based on the total weight of materials, and in grams.

|  | Wt. % | Grams |
| --- | --- | --- |
| $MnO_2$ | 51.81 | 200 |
| Shawinegan Black | 6.48 | 25 |
| $H_2O$ | 27.80 | 107.3 |
| $NH_4Cl$ | 9.56 | 36.9 |
| $ZnCl_2$ | 4.35 | 16.8 |

The Shawinegan Black is a highly structured carbon black in the "100% compressed" form, as made and sold by Shawinegan Products Corp., N.Y., N.Y. The ammonium chloride and zinc chloride were dissolved in the water. The manganese dioxide and carbon were blended together, then mixed into 141 grams of the electrolyte solution and stirred until thoroughly dispersed. The balance, 20 grams, of the electrolyte was added as convenient to temporarily reduce the viscosity of the mix, and thereby assist in blending, as maximum viscosity was approached. Blending was continued until a homogeneous, highly viscous and cohesive mass was obtained.

The cathode mix made as just described was coated on 2 mil Condulon sheets 2.75 inches by 3.42 inches to a depth of 25 mils, over a central area about 2½ inches by 1⅞ inches; the weight of mix per cathode was 3.5–4.0 grams.

The anode patches were made from the following composition, in which composition is expressed in parts by weight, in accordance with the presently preferred practice of the invention.

| Zinc powder | 1,000 |
| --- | --- |
| $H_2O$ | 149.2 |
| Benton LT Dispersant | .61 |
| Tetrasodium pyrophosphate | 125 |
| Shawinegan Black | 5 |
| Polytex 6510 Latex | 39.05 |

In the above composition, Polytex 6510 is an acrylic emulsion resin made and sold by Celanese Corp., of Newark, N.J. Benton LT is an organic derivative of hydrous magnesium aluminum silicate, as made and sold by National Lead Co., Inc. of N.Y., N.Y.

This composition was laid down on the carbonaceous sheet in the manner described above, and then heated to dryness to form a dry patch of an area about 2½ by 1⅞ inches and from 1½ to 2 mils in thickness. On the intercell connectors this operation was performed before the cathode mix was deposited.

The gel electrolyte employed in the batteries to be described had the following composition, in which composition is expressed as parts by weight:

| $NH_4Cl$ | 21.8 |
| --- | --- |
| $ZnCl_2$ | 9.9 |
| $HgCl_2$ | 1.9 |
| $H_2O$ | 63.5 |
| Natrosol 250 HHR | 2.9 |

Natrosol 250 HHR is hydroxyethyl cellulose, sold by Hercules, Inc. of Wilmington, Del.

This composition was coated over the cellophane separator to a thickness of 5.4 mils.

Two batteries were made with the components just described, using a pair of outer frames 43 each 24 mils in thickness, and two inner frames 43 each 18 mils in thickness, of Versalon 1140 hot melt adhesive. These batteries, identified as Examples IA and IB below, were sealed in a series of hot and cold strikes using apparatus modified from the prior art form shown in FIG. 2 by substituting a controlled fluid pressure drive to the inner platen 13 for the spring 14, so that known independent pressure could be applied to the inner and outer platens during sealing. Thirteen hot strikes and four cold strikes were employed. During the hot strikes, of 0.350 seconds operation each, the upper outer platen was heated to 295° F., and the lower outer platen to 330° V. The inner platens were at 18 p.s.i.g., and the outer platens at 70 p.s.i.g. During the cold strikes, of 0.315 seconds each, the inner platens were at 2 p.s.i.g., and the outer platens were at 50 p.s.i.g. The central thickness of these batteries, t1 in FIG. 1, was about 0.151 inches, and the edge thickness t2 was about 0.097 inches.

Two four cell batteries, identified as Examples IIA and IIB below, were made from components prepared as described in Example I above, except that four frames 43 of Versalm 1140 hot melt adhesive each 9.3 to 10 mils in thickness were employed. These batteries were sealed with the apparatus described above in connection with Examples IA and IB, using ten hot strikes and seven cold strikes. During the hot strikes, of 0.350 seconds duration each, the upper outer platen was heated to 285° F., and the lower outer platen to 310° F. The inner platens were at zero pressure, and the outer platens were at 50 p.s.i.g. During the cold strikes, the inner platens were at zero pressure, and the outer platens were at 50 p.s.i.g. The central thickness t1 of these batteries was about 0.180 inches, and the edge thickness t2 was about 0.051 inches.

The batteries of Examples IA and IIA were evaluated in terms of their ability to recharge an electronic flash unit while operating a Polaroid SX-70 Land camera. For this test, an SX-70 Land camera was fitted with an electronic flash unit having a light output of about thirty seven watt seconds, and an input energy requirement of about 80 watt seconds. The flash unit was connected to be charged from the battery under test. The battery was also used to energize the camera to perform the functions of exposure control and film advance in the normal manner, except that, experience having shown that advancing film units through the processing rolls made no detectable difference in the test, no film units were employed. In the test, the initially discharged flash unit is charged unit its ready light glows. The shutter button of the camera is then operated, causing the camera to go through its cycle, during which time the flash unit is discharged. The battery is then electrically disconnected, and allowed thirty seconds to recover. This cycle is estimated to require a total energy of about 90 to 100 watt seconds, and is carried out ten times to simulate a ten-shot photographic sequence. Each time the flash unit is charged during the test, the time between the start of charge and the time when the ready light glows and charging is stopped is noted.

The batteries of Examples IB and IIB were used to recharge the flash unit described above, but with the battery attached to the camera with external leads. The results of both tests are set out in the table below, in terms of the time t in seconds required for each charging cycle. Also listed in the table are the sum S of the recharge time for ten cycles, and the percent compaction C of the edges of the batteries, in which $C = 100 (t_1 - t_2/t_1)$.

|  | EXAMPLE | | | |
|---|---|---|---|---|
|  | IA | IIA | IB | IIB |
| C, % | 35.8 | 71.7 | 35.8 | 71 7 |
| Cycle | Δ t | Δ t | Δ t | Δ t |
| 1 | 3.8 | 4.6 | 3.4 | 4.2 |

-continued

|  | EXAMPLE | | | |
|---|---|---|---|---|
|  | IA | IIA | IB | IIB |
| C, % | 35.8 | 71.7 | 35.8 | 71 7 |
| Cycle | Δ t | Δ t | Δ t | Δ t |
| 2 | 4.2 | 4.8 | 3.6 | 4.6 |
| 3 | 4.4 | 5.4 | 4.0 | 5.0 |
| 4 | 4.6 | 5.8 | 4.0 | 5.2 |
| 5 | 5.0 | 6.0 | 4.4 | 5.8 |
| 6 | 5.2 | 6.6 | 4.8 | 6.2 |
| 7 | 5.4 | 7.0 | 5.0 | 6.6 |
| 8 | 5.8 | 7.4 | 5.2 | 7.2 |
| 9 | 6.0 | 8.0 | 5.4 | 7.6 |
| 10 | 6.0 | 8.2 | 5.4 | 8.0 |
| S | 50.4 | 63.8 | 45.2 | 60.4 |

The clear superiority of the batteries of Examples IA and IB, with more nearly coplanar laminae, is evident from the above table.

While the invention has been described with respect to the details of various illustrative embodiments, many changes and variations will be obvious to those skilled in the art upon reading this description, and such can be made without departing from the scope of the invention.

What is claimed is:

1. A thin, flat laminar battery comprising cells including active components comprising laminar anodes and cathodes separated by laminar separators, said cells being chemically isolated and electrically connected in series by intermediate laminar intercell connectors, insulating frames having central openings receiving said anodes and cathodes and being bonded together to form a peripheral seal surrounding said active components, and terminal laminae comprising opposed thin metal terminal sheets bonded to thermoplastic liquid impervious conductive current collectors, said current collectors being in contact with electrodes of opposite polarity on either side of said battery and being bonded to said frames at their peripheries to complete a seal about said active components without deformation of said metal terminal sheets; in which the combined thicknesses of said frames are substantially equal to the combined thicknesses of said anodes, said cathodes, said separators and said intercell connectors.

2. A flat laminar battery comprising a plurality of superposed laminar cells separated by laminar conductive plastic intercell connectors and terminated by conductive plastic current collectors having metal terminals adhered to the outer surfaces thereof, contiguous laminar insulating frames of hot melt adhesive between said intercell connectors and said current collectors and formed with central openings receiving said cells, said frames being fused to each other and to contiguous portions of said intercell connectors and said current collectors to form peripheral seals around said cells, in which said frames have thicknesses determined in dependence on the combined thickness of said cells and said intercell connectors so that each lamina of said battery has edges substantially coplanar with its central portions after fusion of said frames.

* * * * *